(12) United States Patent
Hinque (10) Patent No.: US 9,308,787 B2
(45) Date of Patent: Apr. 12, 2016

(54) COMPRESSOR FOR A PNEUMATIC TIRE AND A PNEUMATIC TIRE COMPRISING A COMPRESSOR MOUNTED WITHIN THE TIRE CAVITY

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 353 days.

(21) Appl. No.: 14/100,089

(22) Filed: Dec. 9, 2013

(65) Prior Publication Data

US 2015/0158348 A1    Jun. 11, 2015

(51) Int. Cl.
*B60C 23/12* (2006.01)
*F04B 35/01* (2006.01)
*F04B 39/00* (2006.01)

(52) U.S. Cl.
CPC ............ *B60C 23/12* (2013.01); *F04B 35/01* (2013.01); *F04B 39/0005* (2013.01)

(58) Field of Classification Search
CPC ........ B60C 23/10; B60C 23/12; B60C 29/00; F04B 35/01; F04B 39/0005; F04B 9/02
See application file for complete search history.

(56) References Cited

U.S. PATENT DOCUMENTS

| 8,156,978 B1 | 4/2012 | Hinque et al. | |
| 9,061,556 B2 * | 6/2015 | Hinque | B60C 23/12 |
| 2006/0212193 A1 * | 9/2006 | Breed | B60C 23/0425 |
| | | | 701/33.7 |
| 2006/0283534 A1 * | 12/2006 | Hawes | B60C 23/12 |
| | | | 152/415 |
| 2008/0156406 A1 * | 7/2008 | Breed | B60C 23/041 |
| | | | 152/415 |
| 2012/0160386 A1 | 6/2012 | Hinque et al. | |
| 2012/0241063 A1 | 9/2012 | Hinque et al. | |
| 2012/0241064 A1 | 9/2012 | Hinque et al. | |

FOREIGN PATENT DOCUMENTS

| JP | 2004330820 | 11/2004 |
| WO | 2010141638 | 12/2010 |

* cited by examiner

*Primary Examiner* — Kip T Kotter
(74) *Attorney, Agent, or Firm* — David L. King (57) ABSTRACT

An air compressor mountable within an annular cavity of a pneumatic tire comprises an air inlet for receiving air to be pumped into the tire cavity, an air compression chamber in fluid communication with the air inlet, and an air outlet in fluid communication with the air compression chamber. Further, the compressor comprises a pressure compensation chamber in fluid communication with the tire cavity when the air compressor is mounted within the tire cavity, and a double piston having a shaft and two opposing piston ends, the shaft rigidly connecting both piston ends with each other, wherein the first piston end is arranged and movable in the compression chamber and is actuatable by hydraulic pressure between a compression state and an intake state, and wherein the second piston end is arranged and movable in the pressure compensation chamber and subject to the pressure of the tire cavity when the compressor is mounted within the tire cavity. Moreover, the present application is directed to a tire comprising the aforementioned air compressor.

20 Claims, 9 Drawing Sheets

COMPRESSOR FOR A PNEUMATIC TIRE AND A PNEUMATIC TIRE COMPRISING A COMPRESSOR MOUNTED WITHIN THE TIRE CAVITY

FIELD OF THE INVENTION

The invention generally relates to pneumatic tires and more specifically to a tire or self-inflating tire having an integrated air compressor or air pump.

BACKGROUND OF THE INVENTION

Normal air diffusion reduces tire pressure over time so that the natural state of tires is underinflated. Accordingly, drivers should constantly check tire pressure to avoid increased fuel consumption or wear and to avoid impeded braking and/or handling performance. Even more, a substantially underinflated tire may constitute a severe safety risk. Tire pressure monitoring systems have been proposed to warn drivers when tire pressure is significantly low. Such systems, however, remain dependent upon the driver taking remedial action when warned to reinflate a tire to a recommended pressure.

It is desirable, therefore, to provide components which allow or assist in providing an automatic inflation of a tire without requiring any action of the driver.

U.S. Patent Application 2012/0160386 A1 discloses a pump and actuator assembly for a self-inflating tire. The described tire system includes a compression actuator assembly mounted to a tire carcass for compressing air for delivery to a tire cavity. The compression actuator assembly includes a hollow cylindrical containment body formed from a resilient deformable material composition and containing a quantity of non-compressible fluid medium. The containment body is affixed to a relatively high flex-deformation region of the tire carcass and reciprocally transforms between a deformed state and a non-deformed state responsive to the deformation and recovery of the tire high flex deformation region in a rolling tire. Accordingly, the containment body in the deformed state displaces a pressurized displaced quantity of the non-compressible medium which generates a compression force for application to a volume of air delivered to the tire cavity. A pump assembly is fixed to the tire carcass and includes valves for reciprocally opening and closing the inlet opening and the outlet opening of a compressor body synchronously with cyclic transformation of the containment body.

U.S. Patent Application 2012/241063 A1 discloses an air-maintenance tire system including a compression actuator mounted to the tire carcass configured for operative actuation by tire deformation during a tire revolution, a pump assembly affixed to the tire carcass and including a compressor body affixed to the compression actuator and having an internal air chamber. The air chamber has an inlet opening for admitting air into the internal air chamber and an outlet opening for conducting air from the internal air chamber to the tire cavity. The air compressor body further includes a piston valve member and an outlet valve member located within and at opposite respective ends of the internal air chamber, wherein the piston valve member and the outlet valve member move within the internal air chamber responsive to actuation by the compression actuator between respective open and closed positions, whereby cyclically opening and closing the inlet and the outlet openings during an air compression cycle. The described compression actuator includes a hollow containment body formed from a resilient deformable material composition and containing a quantity of a non-compressible medium. The containment body is affixed to a relatively high flex-deformation region of the tire carcass and reciprocally transforms between a deformed state and a non-deformed state to generate a compression force against a piston valve member surface and move the piston valve between the open and closed positions within the air chamber.

U.S. Patent Application US 2012/241064 A1 discloses a similar air-maintenance tire system including a compression actuator mounted to the tire carcass configured for operative actuation by tire deformation during a tire revolution, a pump assembly affixed to the tire carcass and including a compressor body affixed to the compression actuator and having an internal air chamber, the air chamber having an inlet opening for admitting air into the internal air chamber and an outlet opening for conducting air from the internal air chamber to the tire cavity. In contrast to the aforementioned tire system, the air compressor body further includes a deformable membrane valve member and an outlet valve member located within and at opposite respective ends of the internal air chamber. The membrane valve member may deform and the outlet valve member may move within the internal air chamber responsive to actuation by the compression actuator between respective open and closed positions, whereby cyclically opening and closing the inlet and the outlet openings during an air compression cycle. The compression actuator includes a hollow containment body formed from a resilient deformable material composition and containing a quantity of a non-compressible medium. The containment body is affixed to a relatively high flex-deformation region of the tire carcass and reciprocally transforms between a deformed state and a non-deformed state to generate a deformation force against a membrane valve member surface and deform the membrane valve between the open and closed positions within the air chamber.

Although systems for automatic inflation of a tire have been proposed in the cited prior art, room for improvement remains.

SUMMARY OF THE INVENTION

In one aspect, the present invention is directed to an air compressor or pump mountable within an annular tire cavity, as for example to the tire's sidewall, the tire's innerliner opposing a tread region or to a rim, wherein the air compressor comprises an air inlet for receiving air to be pumped into from outside the tire into the tire cavity, an air compression chamber in fluid communication with the air inlet, an air outlet in fluid communication with the air compression chamber and with the tire cavity, and a pressure compensation chamber to be in fluid communication with the tire cavity when the air compressor is mounted within the tire cavity. Further, the compressor comprises a double piston having a shaft and two opposing piston ends, wherein the shaft rigidly connects both piston ends with each other, and wherein the first piston end is arranged and movable in the compression chamber and is actuatable by hydraulic pressure between a compression state and an intake state. The second piston end is arranged and movable in the pressure compensation chamber and is subject to the pressure of the tire cavity when the compressor is mounted within the tire cavity.

The air compressor according to the invention allows a compact design and efficient pumping of air into a tire cavity. The compressor requires only one moving element, i.e. the double piston reciprocating with the first piston end in the compression chamber and the second piston end in the pressure compensation chamber. The second piston end being subject to the pressure of the tire cavity allows a return of the first piston end, via the rigidly connected shaft, from a compression state to an intake state. A spring for pushing the piston back into the intake state after compression is not required.

The compressor may be driven by hydraulic energy provided via hydraulic fluid by a hydraulic engine or actuator. Such a hydraulic engine or actuator is however not within the main focus of the present application. Corresponding hydraulic actuators are disclosed for example in US 2012/0160386 A1, U.S. application Ser. No. 12/975,461 filed on Dec. 22, 2013 or in U.S. application Ser. No. 13/689,858 filed on Nov. 30, 2012 which are incorporated herein by reference. The compressor described herein may also be driven or actuated by another type hydraulic actuator.

According to another aspect, the double piston reciprocates between a first position and a second position, wherein, in the first position, the first piston end is in the intake state being, via the shaft, subject to tire cavity pressure acting on the second piston end when the piston is mounted within the tire cavity, and, in the second position, the first piston end is in the compression state and forces air compressed in the compression chamber out of the fluid outlet and, optionally, the second piston end is moved, via the shaft, against the pressure of the tire cavity.

According to a further aspect, the first piston end blocks air flow from the fluid inlet into the compression chamber and vice versa when the first piston end is in the compression state. In other words, the first piston end reciprocating in the compression chamber serves as a valve opening and closing a fluid channel in fluid connection with the air inlet.

According to another aspect, the air inlet is in fluid communication with a check valve blocking air flow from the compression chamber out of the air inlet.

According to another aspect, the compression chamber has a sidewall guiding a reciprocating movement of the first piston end between the compression state and the intake state and wherein the compressor further comprises an air inlet channel, the air inlet channel connecting the air inlet with an aperture in the sidewall of the compression chamber.

According to another aspect, the pressure compensation chamber has a sidewall guiding a reciprocating movement of the second piston end.

According to another aspect, the compression chamber, the shaft, the piston ends and the compensation chamber are essentially arranged along one axis. In other words, the double piston and its shaft or pistons reciprocate along that axis.

According to a further aspect, the first piston end has a compression surface for compressing air in the compression chamber and an opposite actuation surface actuatable by hydraulic pressure. In other words, the actuation surface faces away from the shaft and/or the compression surface faces towards a bottom of the compression chamber with the reciprocating movement of the piston being guided by the sidewalls of the compression chamber.

According to a further aspect, the compressor further comprises a fluid port for receiving hydraulic fluid, the fluid port being in fluid communication with an actuation surface of the first piston end. Hydraulic pressure may force the first piston end from the intake state into the compression state. Upon drop of hydraulic pressure the first piston end may return from the compression state to the intake state. This reciprocally or cyclic hydraulic pressurizing may for instance be achieved by a hydraulic engine or actuator attached to a region of the tire which cyclically or periodically deflects or deforms upon rolling of the tire.

According to another aspect, at least one of the compression chamber and the compensation chamber has an essentially hollow-cylindrical shape, wherein the first piston end and the second piston end have each a shape corresponding to the shape of the compression chamber or compensation chamber for a sealed reciprocating movement of each piston end in the corresponding chamber.

According to yet another aspect, the second piston end has a first surface for being in contact with the air of the tire cavity and a second surface opposite the first surface, wherein the second surface of the second piston end is in fluid communication with the air inlet. The second surface may face the bottom of the pressure compensation chamber.

The compression chamber or the pressure compensation chamber may also be described as blind hole or blind bore having a bottom, wherein the shaft of the double piston extends and moves through an aperture in the bottom.

According to yet another aspect, the compressor may comprise resilient means biasing the second piston end to assist movement of the double piston into the intake state in the absence of hydraulic pressure and/or avoiding movement or loose movement of the double piston into the compression state in the absence of fluid pressure.

According to a further aspect, the air compressor comprises a wall separating the compression chamber and the pressure compensation chamber, wherein the shaft is guided through an aperture or channel in the wall.

According to another aspect, at least one of the shaft and the aperture in the wall are provided with at least one sealing member preventing air leakage between the compression chamber and the pressure compensation chamber.

According to yet another aspect, the compressor comprises a reed valve assembly fluidly connecting at least one of the air inlet and the air outlet with the compression chamber. The reed valve assembly may separate or delimit two body elements of the compressor, wherein one body element comprises the compression chamber and a second body element comprises the pressure compensation chamber.

According to another aspect, the reed valve assembly comprises a check valve preventing air to escape the compression chamber into the air inlet, and/or a check valve preventing air to escape the tire cavity into the compression chamber.

According to a further aspect, the reed valve assembly consists of a stack of at least three plates or sheets, preferably at least five plates or sheets.

According to another aspect, the plates or sheets extend essentially in a direction perpendicular to the shaft axis, each plate comprising a through hole allowing the shaft to pass the stack of plates, when the plates are laid upon one another According another aspect, the stack provides a first air passage allowing air flow from the air inlet to the compression chamber but blocking air flow from the compression chamber to the air inlet and/or a second air passage allowing air flow from the compression chamber to the air outlet but blocking air flow from the air outlet to the compression chamber.

According to yet another aspect, at least one plate of the stack comprises a reed or flap reversibly bendable between an open position allowing air flow through the first air passage from the air inlet into the compression chamber and a first blocking position blocking air flow through the first air passage from the compression chamber to the air inlet, and/or wherein at least one plate of the stack comprises a reed or flap bendable between an open position allowing air flow from the compression chamber through the second air passage to the air outlet and a blocking position blocking air flow through the second air passage from the air outlet to the compression chamber. In general multiple reeds, in particular two reeds may be provided in one plate.

According to yet another aspect, the compressor comprises at least one of: a duckbill valve allowing airflow from the air inlet to the compression chamber and blocking airflow from the compression chamber to the air inlet; and a duckbill valve allowing airflow from the compression chamber to the air outlet and blocking airflow from the air outlet to the compression chamber According to another aspect, a pneumatic tire assembly is provided comprising a pneumatic tire and an air compressor according to one of the aforementioned aspects, the air compressor may be mounted to the sidewall of the tire within the annular cavity of the tire.

The pneumatic tire assembly may further comprise a rim, wherein the tire is mounted on the rim. The air compressor may be mounted to the rim within the annular tire cavity.

The tire may further comprise an air inlet connectable to the air inlet of the compressor. The tire's air inlet may comprise a passage extending through the tire's sidewall and/or through the rim. It is known in the state of the art how to provide air passages through a tire, for instance through the tire's sidewall. One example is disclosed in U.S. Pat. No. 8,156,978 B1 filed under U.S. application Ser. No. 12/906,179 on Oct. 18, 2010 which is incorporated herein by reference.

Further, the tire assembly may also comprise a hydraulic actuator or engine as described already above as well as conduction means for connecting the compressor to the hydraulic actuator.

All features of the above described aspects of the invention may be combined or replaced with one another.

Definitions

"Axial" and "axially" mean lines or directions that are parallel to the axis of rotation of the tire.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt structure" or "reinforcing belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along or in parallel to the perimeter of the surface of the annular tread perpendicular to the axial direction.

"Equatorial Plane" means the plane perpendicular to the tire's axis of rotation and passing through the center of the tread.

"Groove" means an elongated void area in a tire wall that may extend circumferentially or laterally about the tire wall. The "groove width" may be equal to its average width over its length.

"Peristaltic" means operating by means of wave-like contractions that propel contained matter, such as air, along tubular pathways.

"Radial" and "radially" mean directions radially toward or away from the axis of rotation of the tire.

"Sidewall" means that portion of a tire between the tread and the bead.

"Tread" means a rubber component which when bonded to a tire carcass includes that portion of the tire that comes into contact with the road when the tire is normally inflated and under normal load.

BRIEF DESCRIPTION OF THE DRAWINGS

In the following, the Figures according to the embodiments of the present invention are briefly described. Further details are given in the detailed description of the embodiments. The Figures have the purpose of illustrating the invention and should not be understood in a limiting sense.

DETAILED DESCRIPTION OF THE EMBODIMENTS

Figure 1:
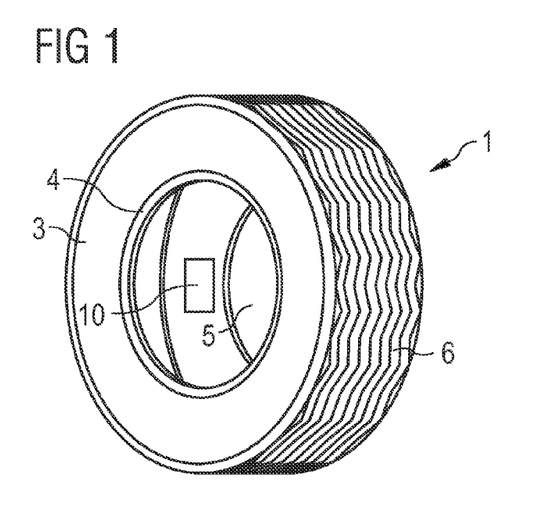
FIG. 1 is a perspective view of a tire comprising a schematically depicted compressor according to a first embodiment of the invention.

Referring to FIG. 1, the present invention is directed to a compressor 10 mounted to a sidewall 3 of a pneumatic tire 1 inside an annular cavity 5 of the tire 1. The sidewall 3 extends between a bead or bead region 4 of the tire 1 to a tread or tread region 6 of the tire 1. The tire 1 may be any pneumatic tire as for instance an air plane, passenger car, off-the-road, or truck tire.

Figure 2:
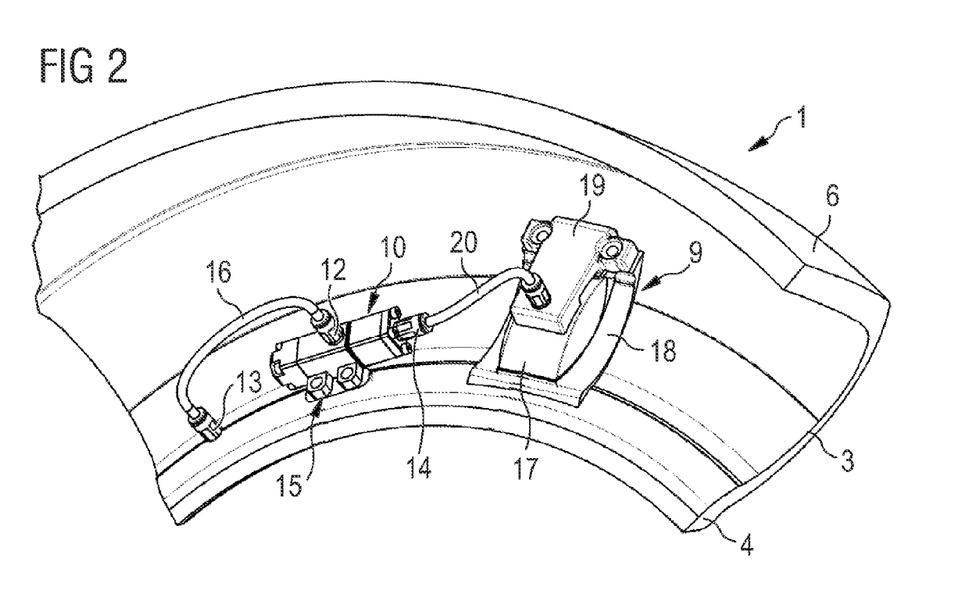
FIG. 2 is a partial three-dimensional cross sectional view of a tire comprising a compressor connected to a hydraulic pump in accordance with another embodiment of the present invention.

FIG. 2 is a schematic partial cross section through the tire 1 according to FIG. 1. The compressor 10 is mounted to the tire's inner sidewall 3 inside the tire cavity. In the depicted embodiment, the compressor 10 is mounted to the sidewall 3 via a screw connection 15. Further, the compressor 10 may be fluidly connected with an air passage through the tire's sidewall. Such a connection may be established via a flexible tube 16 connected on one end to an air inlet 12 of the compressor 10 and on the other end to a connecting member 13 in fluid communication with the air channel or passageway (not shown) through the tire's sidewall 3. Thus, air may enter the compressor 10 via the channel extending through the tire's sidewall, the tube 13 and the inlet 12. The compressor 10 has an outlet (not visible in FIG. 2) such that the compressor 10 may pump air received through the inlet 12 into the tire cavity 5. As shown in FIG. 2, the compressor 10 may be actuated or energized by an engine or hydraulic pump 9 which provides the compressor 10 with hydraulic fluid such as water, oil or any other non-compressible liquid. The depicted engine 9 comprises a compressible bag 17 which comprises the hydraulic fluid. The bag 17 may be mounted to a support 18 fixed to the tire's sidewall 3. Moreover, the engine 9 may comprise a lever arm 19. Upon rolling motion of the tire 1, the support 18 and the bag 17 deform under the tire's sidewall deflection or deformation such that the fluid inside the bag 17 is pressed by the lever arm 19 out of the bag 17 into a tube 20 connected to an hydraulic fluid connection or port 14 of the compressor 10. Thus, when driving the periodic or cyclic deflection of the tire's sidewall 3 forces the hydraulic fluid periodically into the compressor 10. Although depicted as separate elements, the compressor 10 and the engine 9 could be integrated in a single pumping device. The tube 16 and 20 could be omitted.

Although the compressor 10 and the engine 9 are shown as screwed to the tire's sidewall 3, one or both may be glued to the tire 1. Screws might be made of metal or plastics. The same applies to the elements of the compressor 10 or the engine 9. At least some of the elements of the engine, i.e. the bag 17, the support 18 and the lever arm 19 may, for example, be made of rubber, silicone, plastics or metal.

Figure 3:
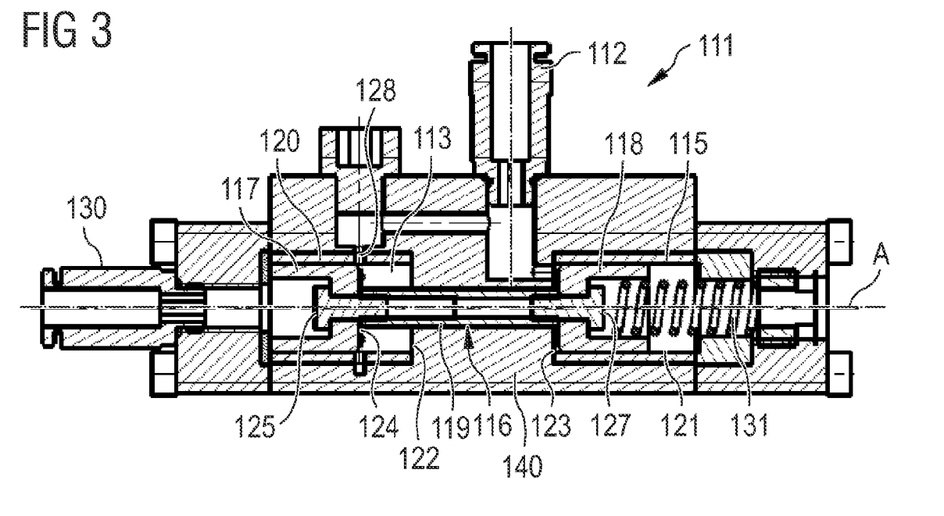
FIG. 3 is a cross sectional view of a compressor in accordance with an embodiment of the present invention in an intake state.
Figure 4:
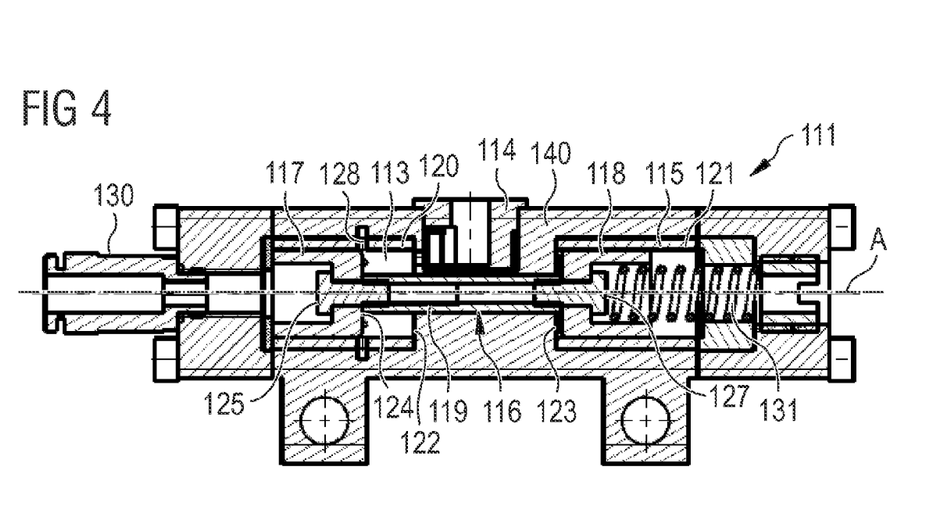
FIG. 4 is a cross sectional view of the compressor according to FIG. 3 but orthogonal to the cross section of FIG. 3.

FIGS. 3 and 4 show two cross sectional views of a preferred compressor embodiment in an intake state. As depicted in FIG. 3, the compressor 111 comprises an air inlet 112 allowing air to enter the compressor 111 and a compression chamber 113 in fluid communication with the air inlet 112. Referring to FIG. 4, the compression chamber 113 is in fluid communication with an air outlet 114 through which air may exit the compressor 111 to be released to the tire cavity. Preferably, the air outlet 114 comprises or is operably associated with a check valve blocking air flow from the tire cavity back into the compressor 111. The compressor further comprises a pressure compensation chamber 115 which is in (direct) fluid communication with the tire cavity or in other words with the environment of the compressor 111. Both chambers 113 and 115 are divided by a wall portion 140.

Further, the compressor 111 comprises a double piston or double piston assembly 116 comprising a shaft or rod 119 connecting to opposing piston ends 117, 118. A first piston end 117 is arranged and movable in the compression chamber 113, whereas the second piston end 118 is arranged and movable in the compensation chamber 115. In other words each piston end 117, 118 may reciprocate in its associated chamber 113, 115 wherein the shaft rigidly connects both ends 117, 118. The shaft 119 connecting both piston ends 117, 118 may slight in a channel or aperture extending through the wall 140 between the compression chamber 113 and the compensation chamber 115. The shaft 119 may be axially guided in the channel or aperture, wherein the shaft 119 and/or the channel may comprise sealing elements (not shown) for avoiding air leakage between the compression chamber 113 and the pressure compensation chamber 115.

The double piston 116 may be driven by hydraulic pressure, in particular a hydraulic fluid entering the compressor 111 through the hydraulic inlet or port 130. In general, the double chambers 113, 115 and the double piston 116 are arranged along a common axis A, wherein the shaft 119 of the piston 116 extends along that axis A. Moreover, the reciprocating motion of the piston 116 and its ends 117, 118 takes place along that axis. Accordingly the sidewalls 120 and 121 extend in parallel to that direction and the bottoms 122 and 123 of each chamber extend essentially perpendicular to that direction A. As further depicted in FIGS. 3 to 6, each piston end 117, 118 may have a cup-like shape or a U-shaped cross section in a plane in parallel to the shaft axis A, wherein the bottom of the cup or U-shape faces the shaft 119. The piston ends 117, 118 may be (removably) fixed to the shaft 119, as for example via one or more screws. However other known connection techniques may be used for connecting the piston ends 117 and 118 to the shaft 119. The above described preferred shape of the piston ends 117, 118 may reduce weight and may yet provide a high mechanical stability and may improve sealing between the piston end 117, 118 and the sidewall 120, 121 of the respective chamber 113, 115.

Figure 5:
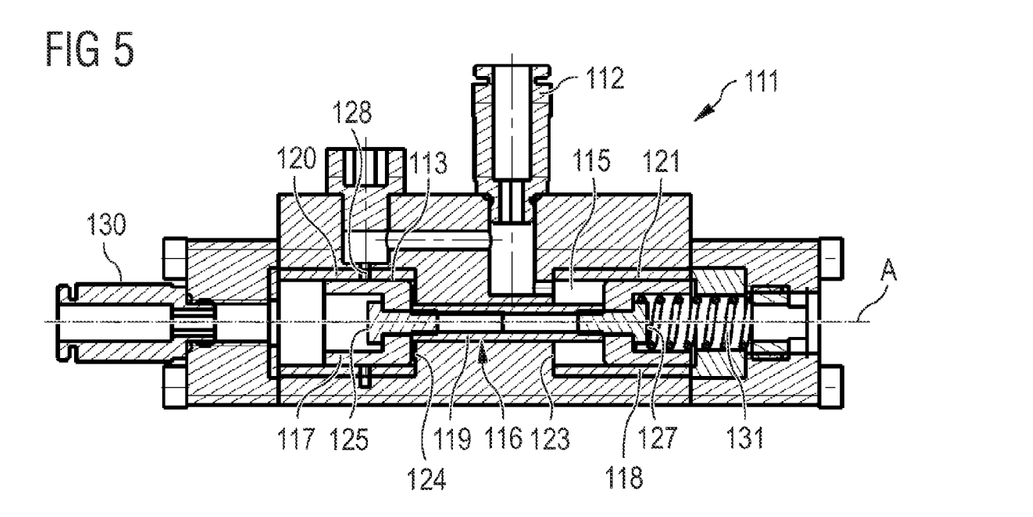
FIG. 5 is a cross sectional view of the compressor according to FIG. 3 but in a compression state.
Figure 6:
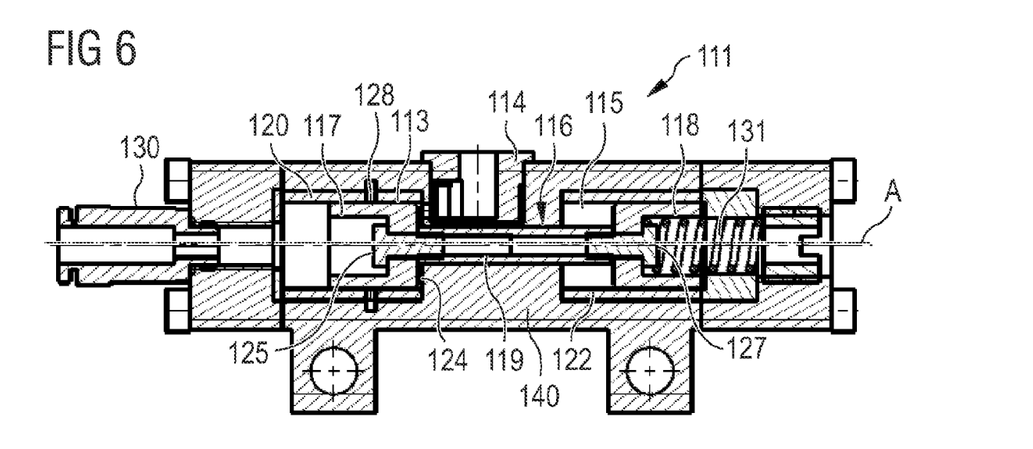
FIG. 6 is a cross sectional view of the compressor according to FIG. 4 but in the compression state.

A hydraulic fluid entering the compressor 111 through the hydraulic inlet 130 may press the first piston end 117 into a compression state as depicted in FIGS. 5 and 6 by acting on an actuating surface 125 of the first piston 117 opposed to a compression surface 124 facing the compression chamber 113. In particular, the compression chamber 113 may be described as a blind hole or bore having a bottom 122 and side walls 120 wherein the compression surface 124 faces the bottom 122 of the compression chamber 113 The cross section of that hole or bore 113 may be circular but may have any other cross-section as for example a rectangular cross section. The first piston end 117 is guided by the sidewall 120 of the chamber 113 between the intake state depicted in FIGS. 3 and 4 and the compression state depicted in FIGS. 5 and 6. Further, the sidewall 120 of the compression chamber 113 may comprise an aperture or annular channel fluidly connecting the compression chamber 113 with the air inlet 112.

The pressure compensation chamber 115 may also be described as a blind hole or bore having a bottom 123 and sidewalls 121. Similar to the first piston end 117 in the compression chamber 113, the second piston end 118 may reciprocate along the sidewall 121 of the pressure compensation chamber 115. The cross section of the chamber 115 and the corresponding cross section of the second piston end 118 may vary as already described for the first piston end 117 and the compression chamber 113. Each piston end 117, 118 and/or each sidewall 120, 121 may comprise one or more sealing elements (not shown) for avoiding air or fluid leakage between the sidewall of the respective chamber 113, 115 and the piston end 117, 118.

As best visible in FIG. 5, the pressure compensation chamber 115 is in fluid communication with the air inlet 112 such that the pressure in the tire cavity may press the second piston end 118 into the direction of the bottom 123 of the pressure compensation chamber 115 wherein air is pressed out of the pressure compensation chamber 115. In addition, the second piston end 118 may be biased by a resilient member 131 which may help to push the double piston 116 back into an intake position. However, in view of the fact that the second piston end 118 is in fluid communication with the tire cavity, the pressure of the tire cavity pushes the piston into an intake position in the absence of a hydraulic pressure on the first piston end 117.

Now the operation of the compressor 111 as depicted in FIGS. 3 to 6 will be described. According to FIG. 1, air may enter the compressor via the air inlet 112 and the aperture or channel 128 in the side wall 120 into the compression chamber 113. In this first state or intake state of the compressor 111 or double piston 116, the second piston end 118 is refracted along axis A into the direction of the compression chamber 113, wherein the second piston end 118 is subject to the pressure of the tire cavity. Air present in the pressure compensation chamber 115 before movement of the double piston 116 into the intake state is pressed out of an aperture in the bottom 123 or the pressure compensation chamber into the air inlet 112 and/or the compression chamber 113. Additionally, the spring 131 and/or the hydraulic fluid withdrawn through the hydraulic fluid port 130 may help to force the double piston 116 into the intake state. In the intake state, air may not exit the tire cavity via the compression chamber 113 due to a check valve as e.g. provided in the air outlet 114, for instance as sleeve valve.

In FIGS. 5 and 6 the second or compression state of the compressor 111 is depicted. In this state, the first piston end 117 has moved upon actuation by hydraulic pressure along axis A into the direction of the pressure compensation chamber 115 so as to force or press the air out of the compression chamber 113 through the air outlet 114 as visible in FIG. 6. Referring to FIG. 5, the second piston end 118 rigidly connected via the shaft 119 to the first piston end 117 has moved into a direction facing away from the compression chamber 113 or from the bottom 123 of the pressure compensation chamber 115, thus allowing air to flow from the air inlet 112 into the pressure compensation chamber 115. This air flow assures that the movement of the double piston 116 is not impeded by air decompression in the pressure compensation chamber 115. Further, when moving from the intake state to the compression state, the first piston end 117 blocks or seals the inlet aperture or channel 128 such that air cannot exit the compression chamber through that aperture or channel 128 and through the air inlet 112. However, in general, the aperture 128 could also be positioned at the bottom of the compression chamber 113, wherein air flow from the compression chamber 113 back to the air inlet 112 could be blocked via a further check valve. After the double piston 116 has moved into the compression state it returns to the intake state as described in view of FIGS. 2 and 4. In particular, this is possible upon retraction of hydraulic fluid from the actuating side 125 of the first piston end 113 via the hydraulic fluid inlet 130, wherein the returning movement of the double piston 116 is supported by the pressure of the tire cavity forcing the second piston end by pressure of its surface 127 facing away from the bottom 123 of the pressure compensation chamber 115.

In FIGS. 3 to 6 the hydraulic fluid hub 130, the air inlet 112 and the air outlet 114 are depicted in specific orientations or positions. However, the invention shall not be limited to such orientations or positions.

Figure 7:
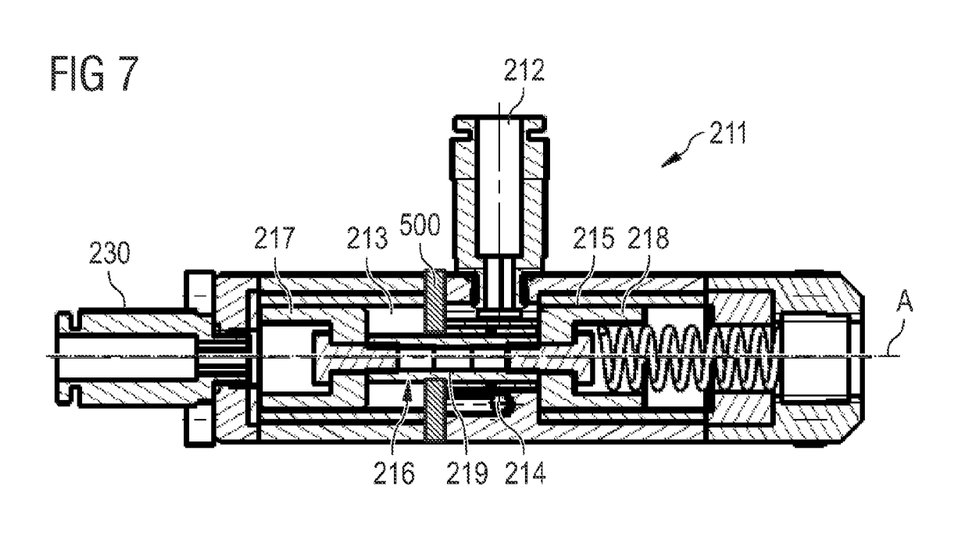
FIG. 7 is a cross sectional view of a compressor according to another embodiment, the compressor being shown in an intake state.
Figure 8:
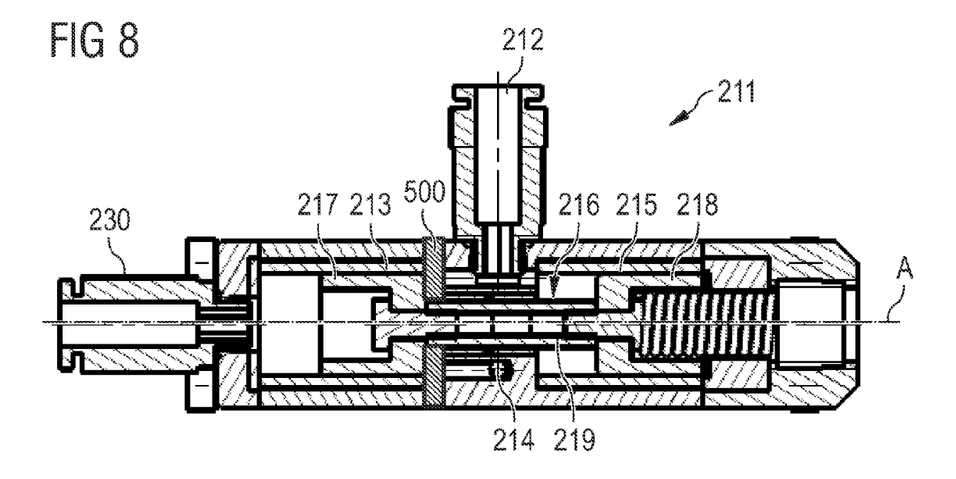
FIG. 8 is a cross sectional view of the compressor according to FIG. 7 but in a compression state.

FIGS. 7 and 8 depict a further preferred embodiment of the present invention. The main components of the depicted compressor 211 are functionally equal to the components already described in relation to the embodiment of FIGS. 3 to 6. Referring now to FIGS. 7 and 8, the compressor 211 comprises an air inlet 212, a compression chamber 213, an air outlet 214, a pressure compensation chamber 215 as well as a piston unit 216 having a shaft 219, a first piston end 217 and a second piston end 218. Further, the compressor 211 has a hydraulic fluid inlet 230 for actuating movement of the double piston 216. The chambers and pistons may be formed as those already described in relation to FIGS. 3 to 6 so that these are not described here in further detail. Moreover, the movement between a first or intake state and a second or compression state is equal to the description of the preceding embodiment.

A main difference from the embodiment described in relation to FIGS. 3 to 6 consists in that the air inlet 212 is fluidly connected to the compression chamber 213 via a reed valve assembly 500. Similarly the air outlet 214 is fluidly connected to the compression chamber 213 via the reed valve assembly 500. Basically, the reed valve assembly may replace a check valve associated with the air outlet 114 and the aperture or channel 128 described with respect to the embodiment of FIGS. 3 to 6.

Figure 11:
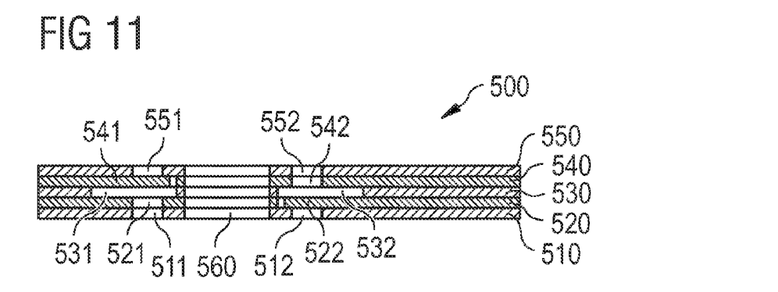
FIG. 11 is a cross sectional view of the reed valve assembly depicted in FIGS. 7 and 8.

The structure and function of the reed valve assembly is described in further detail with reference to FIGS. 11 and 12. FIG. 11 shows a cross section of the reed valve assembly along axis A passing through the shaft 219 of the double piston 216. The reed valve assembly 500 comprises a stack of multiple plates 510, 520, 530, 540, and 550. Each plate of the assembly 500 comprises a through hole 560 for receiving the shaft 219 of the double piston 216. In other words, the shaft 219 extends through these apertures in the plates of the assembly 500. Further, plates 510, 520, 530 and 550 comprise superposed apertures 511, 521, 531 and 551 for providing a fluid passage through the plate assembly 500 from the fluid inlet 212 to the compression chamber 213. Plate 540 comprises a reed or flap 541 for blocking the aperture 551. This reed 541 functions as a check valve allowing fluid to pass the reed valve assembly 500 from the opening 551 through openings 531, 521 and 511. In this direction of fluid flow, the reed 541 bends into the space of hole 531 which has a larger cross section as the reed 541. In a reverse flow direction reed 541 blocks fluid flow from the compression chamber 213 to the inlet since the reed 541's cross section is larger than the cross section of hole 551. Thus, the reed 541 may not bend into opening 551 and blocks fluid flow from the compression chamber 213 to the air inlet 212.

In a similar manner the reed valve assembly 500, allows fluid flow through openings 512, 532, 542, 552 from the compression chamber to the air outlet 214. In particular, plate 520 comprises a reed or flap 522 having a larger cross sectional area than the hole 512 so as to cover the hole 512 in a closed position. Upon compression in the compression chamber 213, the reed 522 is opened and bends into the space of hole 532 which has a larger cross sectional area than the reed 522 in order to receive the bending reed and to allow fluid passing the reed valve assembly 500 from compression chamber 213 to the fluid outlet 214.

The plates of the reed valve assembly 500 may be made of metal, e.g. steel or spring steel, plastics or rubber. Further, the plates of the plate assembly 500 may comprise through holes for receiving screws, connectors or rods for mounting the plates of the plate assembly 500 to the compressor 211.

The depicted reed valve assembly 500 is compact in view of the through hole 560 being arranged between the group of openings 511, 521, 531, 551 and the group of openings 512, 532, 542, 552. Further, the reed valve assembly 500 comprises a check valve function for the inlet of air to the compression chamber 213 as well as for the outlet of air from the compression chamber 213 to the air outlet 214. Preferably all holes, apertures or reeds may be machined, cut or drilled in the plates of the plate assembly 500.

Figure 12:
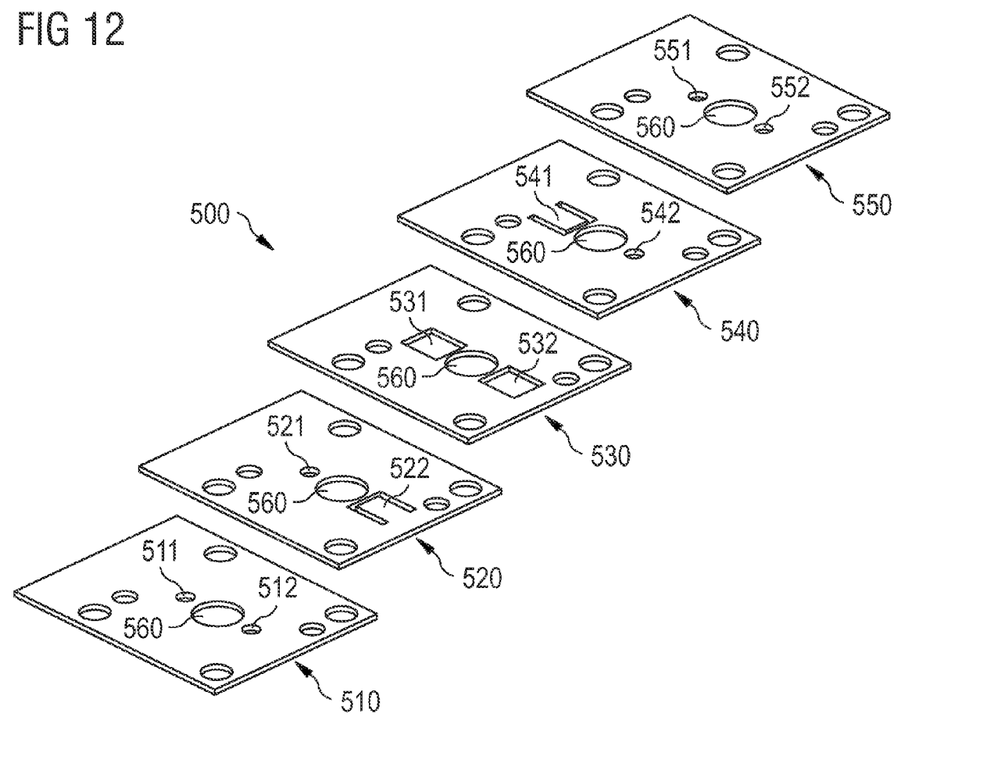
FIG. 12 is an exploded perspective view of the reed valve assembly depicted in FIGS. 7, 8 and 11.
Figure 13:
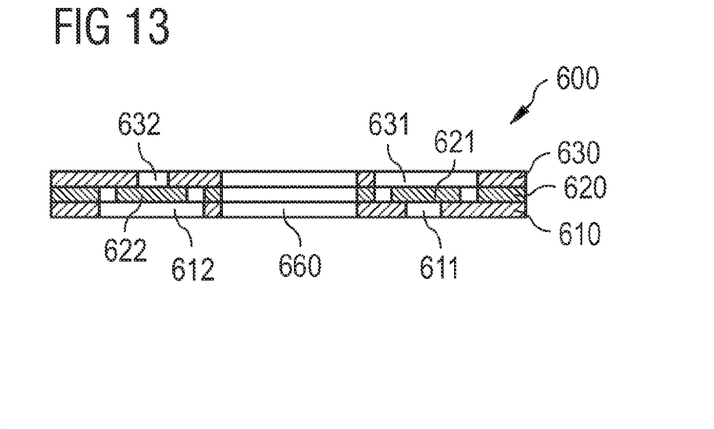
FIG. 13 is a cross sectional view of an alternative reed valve assembly.
Figure 14:
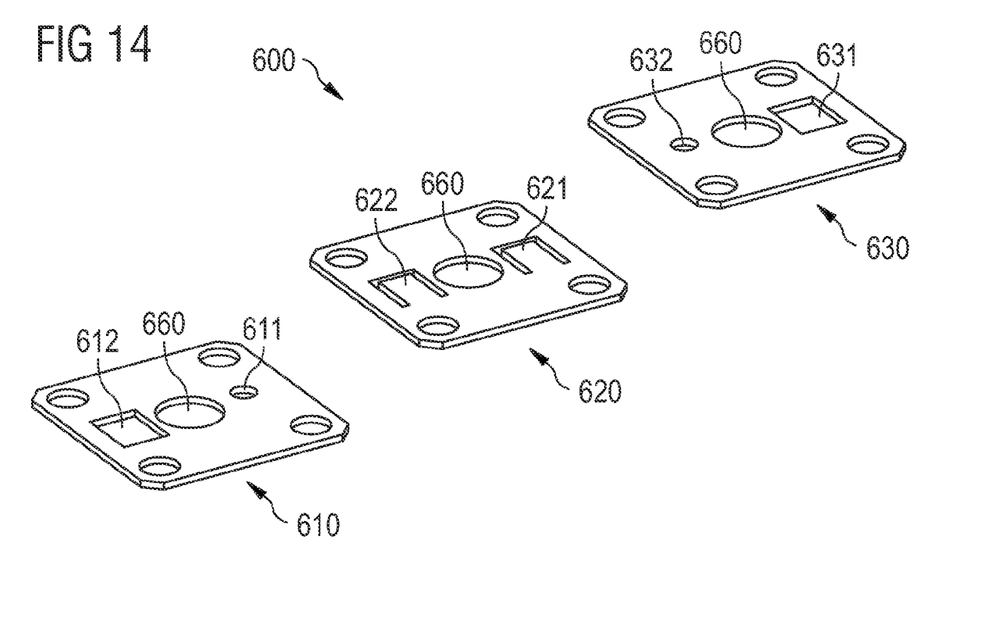
FIG. 14 is an exploded view of the reed valve assembly according to FIG. 13.

The plate assembly depicted in FIGS. 11 and 12 comprises five plates. FIGS. 13 and 14 show an alternative embodiment of a reed valve assembly 600 comprising only three plates 610, 620, 630 which may also be provided in the compressor 211 according to FIGS. 7 and 8. Reed valve assembly 600 comprises also a passage 660 for a shaft 219 by providing corresponding through holes 660 in each valve plate 610, 620, 630 which are brought into register when the plates of the plate assembly are in a stacked or mounted configuration. Further, the plates 610 and 630 comprise apertures 612 and 632 allowing fluid flow from the air inlet 212 to the compression chamber 213. Accordingly, the passage through apertures 611 and 631 of plates 610 and 630 allows fluid flow from the compression chamber 213 to the air outlet 214. In the inlet direction, reed 622 may bend into the space of aperture 612, thus allowing fluid flow from the aperture 632 to aperture 612, whereas in a reverse flow direction bending of the reed 622 is blocked by smaller aperture 632. Further, flow from the compression chamber 213 to the fluid outlet 214 is allowed by bending of the reed 621 into the aperture 631. In case of fluid entering the aperture 631 and flowing in the direction of the compression chamber 213, fluid flow is blocked by reed 621 tightly covering aperture 611. Multiple features and properties of the plates already described in the context of FIGS. 11 and 12 may also apply to the embodiment of FIGS. 13 and 14.

Figure 9:
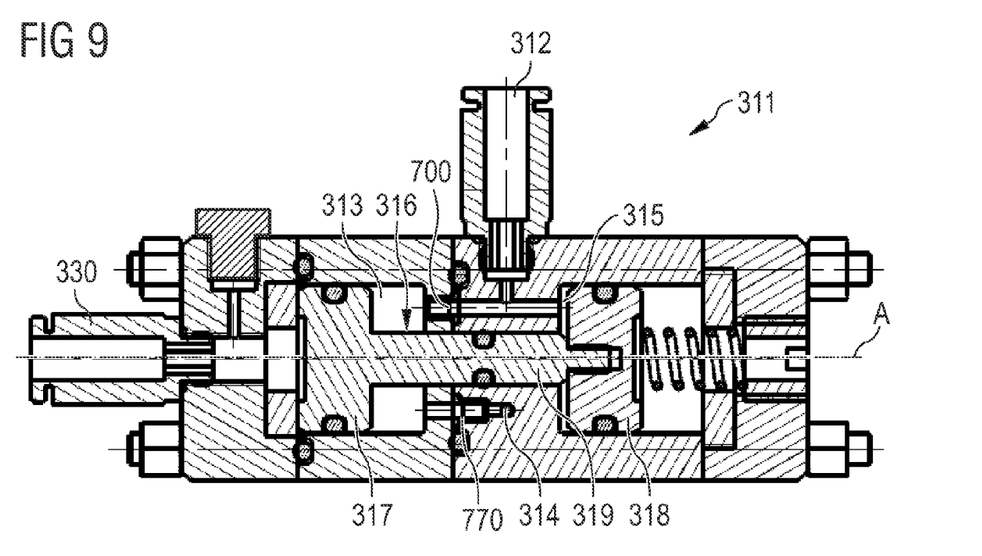
FIG. 9 is a cross sectional view of a further compressor in an intake state according to the present invention.
Figure 10:
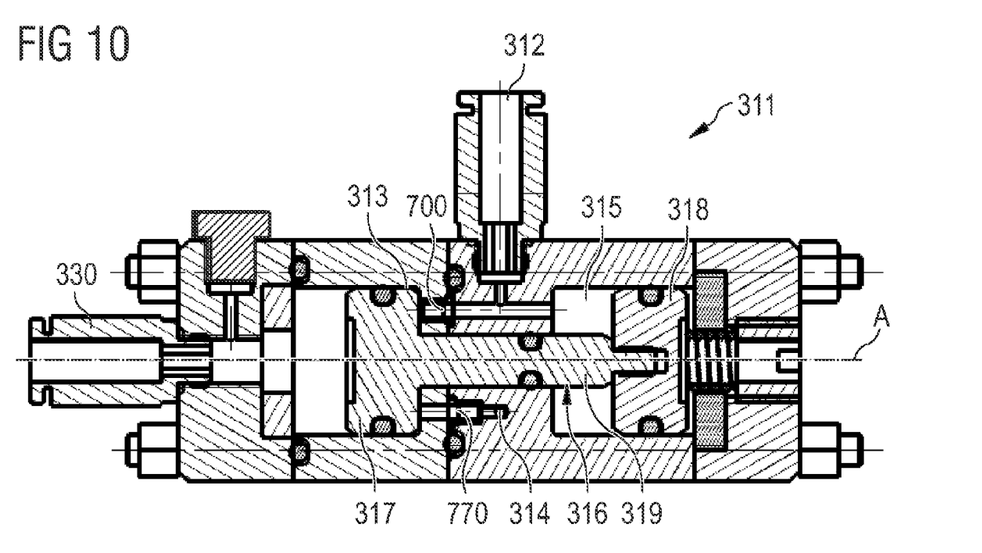
FIG. 10 is a cross sectional view of the compressor according to FIG. 9 in a compression state.

Referring now to FIGS. 9 and 10, a compressor 311 has in general the same components as the compressors 111 and 211 already described with respect to FIGS. 3 to 8.

The compressor 311 comprises an air inlet 312, a compression chamber 313, an air outlet 314, a pressure compensation chamber 315 as well as a piston unit 316 having a shaft 319, a first piston end 317 and a second piston end 318. Further, the compressor 311 has a hydraulic fluid inlet 330 for actuating movement of the double piston 316. The chambers and pistons may be formed as those already described in relation to FIGS. 3 to 8 so that these are not described herein in further detail. Further, the movement between a first or intake state and a second or compression state is equal to the description of the preceding embodiments.

A main difference from the embodiment described in relation to FIGS. 3 to 6 consists in that the air inlet 312 is fluidly connected to the compression chamber 313 via a duckbill valve 700. Similarly, the air outlet 314 is fluidly connected to the compression chamber 313 via a second duckbill valve 770 which may be equal to the aforementioned valve 700. Basically, the duckbill valves 700, 770 replace the check valve associated with the air outlet 114 and the aperture or channel 128 described with respect to the embodiment of FIGS. 3 to 6.

Figure 15:
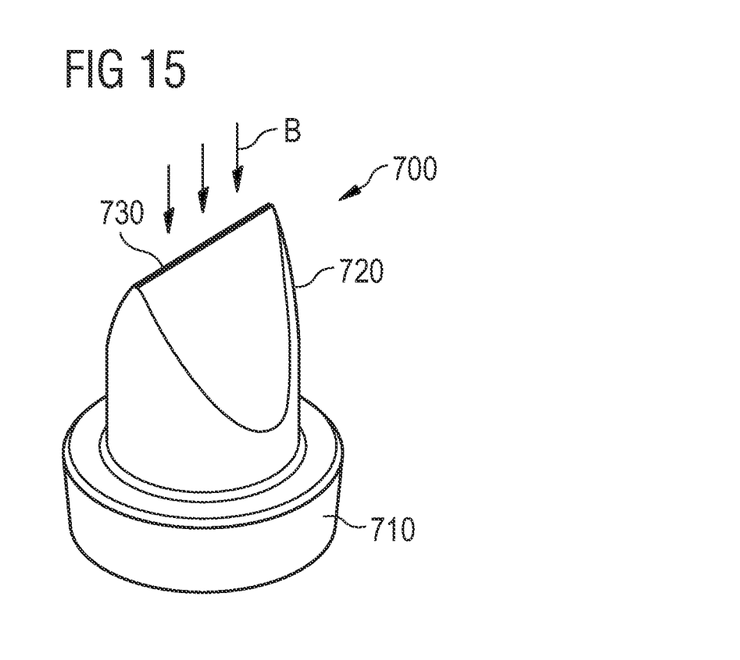
FIG. 15 is a schematic perspective view of a duckbill valve in a blocking state.
Figure 16:
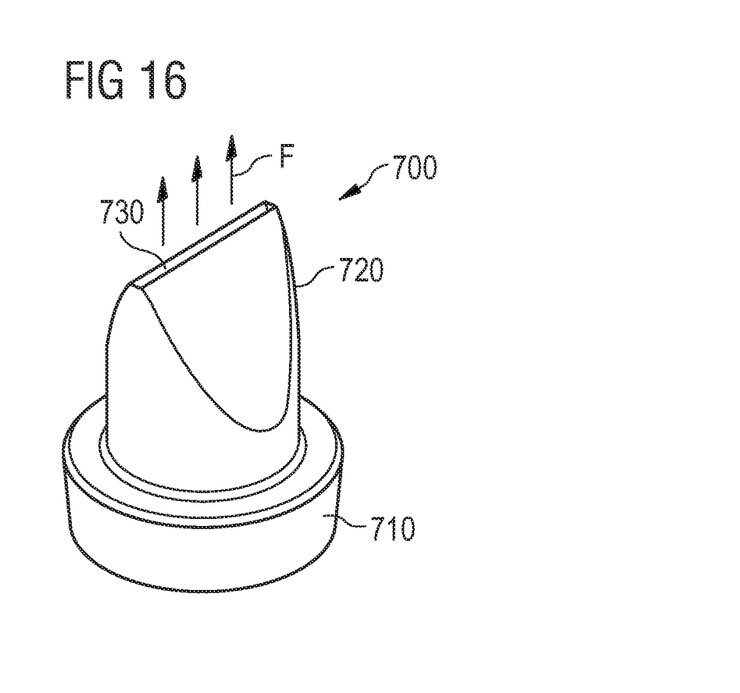
FIG. 16 is a schematic perspective view of the duckbill valve according to FIG. 15 in an open state.

Duckbill valves are in principle known in the prior art and are available with cross sections of at least about 2 mm. FIGS. 15 and 16 show an exemplary duckbill valve 700 in detail. The valve may have base portion 710 corresponding to the cross section of the air passage to which it is mounted. Although the cross section is shown as circular cross section, the air passage and the corresponding valve base 710 may have other cross sections as e.g. rectangular cross sections. In a tapering valve portion 720 opposing the base portion 710, the duckbill valve 700 comprises a slit 730, wherein the valve portion 720 tapers from the base portion 710 towards the slit 730. In the absence of any fluid pressure, the slit 730 is closed. If fluid pressure is applied in a direction such that fluid would enter the slit 730 in towards the base portion 710, fluid flow is blocked by the slit 730 in that blocking direction B. As shown in FIG. 16, the same valve 700 allows however fluid flow in a reverse direction F, wherein fluid flows from the base portion 710 towards and through the slit 730. In this allowed flow direction F fluid may pass the duckbill valve 700. Valve 770 as such may be equal to valve 700. It is emphasized that the slit 730 may have different shapes than depicted in FIGS. 15 and 16. In particular, the slit may further extend into a direction of the base portion 710 along the valve portion 720. This may allow a wider opening of the slit when fluid passes through the duckbill valve from the base portion into the direction of the slit.

Referring again to FIGS. 9 and 10, duckbill valve 700 allows fluid flow from the air inlet 312 into the compression chamber 313 but blocks fluid flow from the compression chamber 313 back to the air inlet 312. In particular, the compression chamber 313 may have an aperture at its bottom fluidly connecting the air inlet 312 with the compression chamber 313 via the duckbill valve 700. Duckbill valve 770 allows fluid flow from the compression chamber 313 to the air outlet 314 but blocks fluid flow from the outlet 314 to the pressure chamber 313. Preferably, the compression chamber 313 may comprise an aperture at its bottom fluidly connecting the fluid outlet 314 via the valve 770 with the compression chamber 313.

Figure 17:
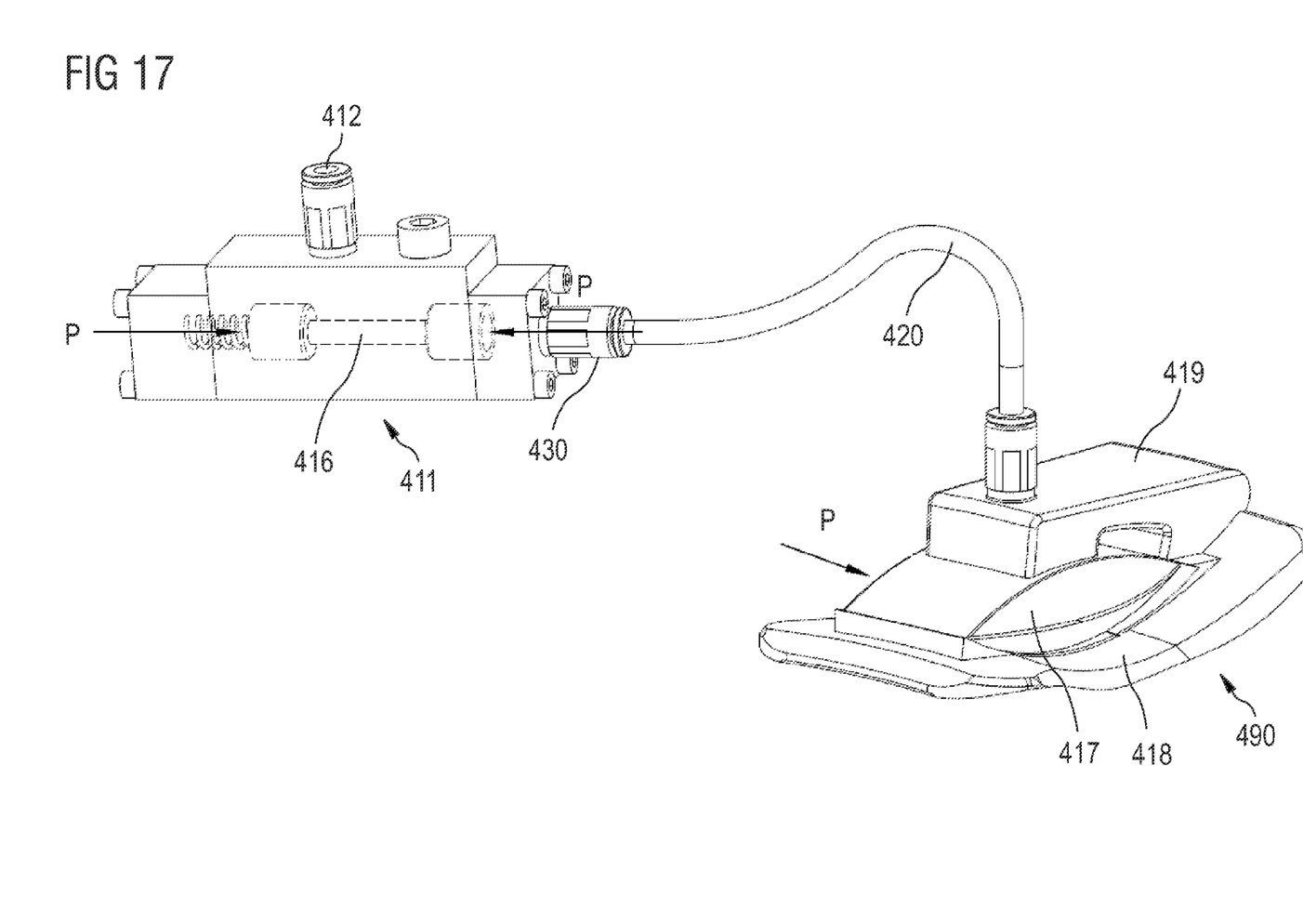
FIG. 17 is a schematic perspective view of another exemplary embodiment of a compressor connected to a hydraulic pump.

FIG. 17 is a schematic perspective view of a further compressor 411 comprising an air inlet 412, a double piston 416, a hydraulic inlet 430, and an air outlet (not visible in the perspective of FIG. 17) for releasing air into the tire cavity. These elements may be equal or have the same function as described with regard to preceding embodiments. The compressor 411 is fluidly connected via a tube 420 to a hydraulic engine or pump 490. As described with respect to FIG. 1, such a pump 490 may comprise a flexible reservoir 417 containing a hydraulic fluid and having a lever arm 419 as well as a support 418 for mounting the pump 419 to a tire's sidewall. As indicated in FIG. 17, the tire cavity pressure P is exerted on the reservoir 417. Substantially the same pressure P is communicated via the tube 420 and through the hydraulic inlet 430 to a first end of the double piston 416. As further depicted in FIG. 17, the other end of the double piston 416 may optionally be biased by a spring and is also in fluid communication with the tire cavity. Thus, that piston end is always subject to the tire cavity pressure P. Consequently, independent of the pressure of tire inflation P, the double piston 416 may keep the air compression chamber at the intake state when the tire is inflated.

The further example according to FIG. 17 may comprise elements already described with respect to FIGS. 3 to 16. The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof In any case, the above described embodiments shall not be understood in a limiting sense. In particular, the features of the above embodiments may also be replaced by one another or combined with one another.

The invention claimed is:
1. An air compressor mountable within an annular tire cavity of a pneumatic tire, the air compressor comprising:
 an air inlet for receiving air to be pumped into the tire cavity;
 an air compression chamber in fluid communication with the air inlet;
 an air outlet in fluid communication with the air compression chamber;
 a pressure compensation chamber in fluid communication with the tire cavity when the air compressor is mounted within the tire cavity; and
 a double piston having a shaft and two opposing piston ends, the shaft rigidly connecting both piston ends with each other, wherein the first piston end is arranged and movable in the compression chamber and is actuatable by hydraulic pressure between a compression state and an intake state, and the second piston end is arranged and movable in the pressure compensation chamber and subject to the pressure of the tire cavity when the compressor is mounted within the tire cavity.

2. The air compressor according to claim 1, wherein the double piston reciprocates between a first position and a second position, and wherein, in the first position, the first piston end is in the intake state being, via the shaft, subject to tire cavity pressure acting on the second piston end when the piston is mounted within the tire cavity, and in the second position, the first piston end is in the compression state and forces air compressed in the compression chamber out of the fluid outlet, and the second piston end is moved, via the shaft, against the pressure of the tire cavity.

3. The air compressor according to claim 1, wherein the first piston end blocks air flow from the fluid inlet into the compression chamber and vice versa when the first piston end is in the compression state.

4. The air compressor according to claim 3, wherein the air compression chamber has a sidewall guiding a reciprocating movement of the first piston end between the compression state and the intake state and wherein the air compressor further comprises an air inlet channel, the air inlet channel connecting the air inlet with an aperture in the sidewall of the air compression chamber.

5. The air compressor according to claim 1, wherein the air compression chamber, the shaft, the piston ends and the compensation chamber are essentially arranged along a single axis.

6. The air compressor according to claim 1, wherein the first piston end has a compression surface for compressing air in the compression chamber and an opposite actuation surface actuatable by hydraulic pressure.

7. The air compressor according to claim 6, wherein the air compressor further comprises a fluid port for receiving hydraulic fluid, the fluid port being in fluid communication with the actuation surface of the first piston end.

8. The air compressor according to claim 1, wherein at least one of the air compression chamber and the pressure compensation chamber has an essentially hollow-cylindrical shape and wherein the first piston end and the second piston end have each a shape corresponding to the shape of the compression or compensation chamber for a sealed reciprocating movement of each piston end in the respective chamber.

9. The air compressor according to claim 1, wherein the second piston end has a first surface for being in contact with the air of the tire cavity and a second surface opposite the first surface, wherein the second surface of the second piston end is in fluid communication with the air inlet.

10. The air compressor according to claim 1, further comprising resilient means biasing the second piston end to assist moving the double piston into the first position.

11. The air compressor according to claim 1, further comprising a wall separating the compression chamber and the compensation chamber, wherein the shaft is guided through an aperture in the wall.

12. The air compressor according to claim 1, further comprising a reed valve assembly fluidly connecting at least one of the air inlet and the air outlet with the compression chamber.

13. The air compressor according to claim 12, wherein the reed valve assembly comprises a check valve preventing air to escape the air compression chamber into the air inlet, and a check valve preventing air to escape the tire cavity into the air compression chamber.

14. The air compressor according to claim 13, wherein the reed valve assembly consists of a stack of at least three plates.

15. The air compressor according to claim 14, wherein the plates extend essentially in a direction perpendicular to the shaft axis, each plate comprising a through hole allowing the shaft to pass the stack of plates.

16. The air compressor according to claim 15, wherein at least one plate of the stack comprises a first reed reversibly bendable between a first open position allowing air flow through the first air passage from the air inlet into the air compression chamber and a first blocking position blocking air flow through the first air passage from the air compression chamber to the air inlet, and wherein at least one plate of the stack comprises a second reed bendable between a second open position allowing air flow from the air compression chamber through the second air passage to the air outlet and a second blocking position blocking air flow through the second air passage from the air outlet to the air compression chamber.

17. The air compressor according to claim 14, wherein the stack comprises at least one of: a first air passage allowing air flow from the air inlet to the air compression chamber but blocking air flow from the compression chamber to the air inlet; and a second air passage allowing air flow from the compression chamber to the air outlet but blocking air flow from the air outlet to the air compression chamber.

18. The air compressor according to claim 1, further comprising at least one of: a duckbill valve for allowing airflow from the air inlet to the air compression chamber and blocking airflow from the air compression chamber to the air inlet; and a duckbill valve for allowing airflow from the air compression chamber to the air outlet and blocking airflow from the air outlet to the air compression chamber.

19. A pneumatic tire assembly comprising a tire having an annular tire cavity, and an air compressor according to claim 1.

20. The pneumatic tire assembly of claim 19, the air compressor being mounted to the sidewall of the tire within the tire cavity.

* * * * *